March 17, 1959  J. MERCIER  2,877,497
APPARATUS FOR MOLDING BLADDERS
Filed Nov. 19, 1953

INVENTOR.
Jean Mercier
BY Dean Fairbank & Hirsch
ATTORNEYS

United States Patent Office 2,877,497
Patented Mar. 17, 1959

2,877,497

APPARATUS FOR MOLDING BLADDERS

Jean Mercier, New York, N. Y.

Application November 19, 1953, Serial No. 393,145

4 Claims. (Cl. 18—42)

This invention relates to the art of forming molded articles and more particularly to equipment for forming bladders.

As conducive to an understanding of the invention, it is noted that where during the process of forming a bladder from suitable material such as, for example, natural or synthetic rubber, a hydraulic press is used throughout the heat curing process in an attempt to maintain pressure on the bladder being formed, leakage of rubber from the mold cavity that is not compensated by such hydraulic press will result in a product which may have voids or air pockets therein and the various materials from which the bladder is formed may not bond together to form a homogeneous unit. In addition, the use of a hydraulic press during the curing process is extremely awkward, and as the press is tied up for the relatively long curing period, the productive rate of bladders per hydraulic press is necessarily very low.

It is accordingly among the objects of the invention to provide simple equipment for forming bladders from a rubber-like material, which equipment requires but a relatively simple change from the equipment commonly used to fabricate bladders, yet dispenses with the need for utilizing a hydraulic press during the relatively long heat curing period, and provides a continuous pressure on the contents of the mold cavity to compensate for any leakage therefrom so that the resultant bladder will be substantially devoid of gas pockets and voids and is a substantially non-porous homogeneous unit.

According to the invention these objects are accomplished by the arrangement and combination of elements hereinafter described and particularly recited in the claims.

In the accompanying drawings in which is shown one of the various possible embodiments of the several features of the invention;

Figure 1:
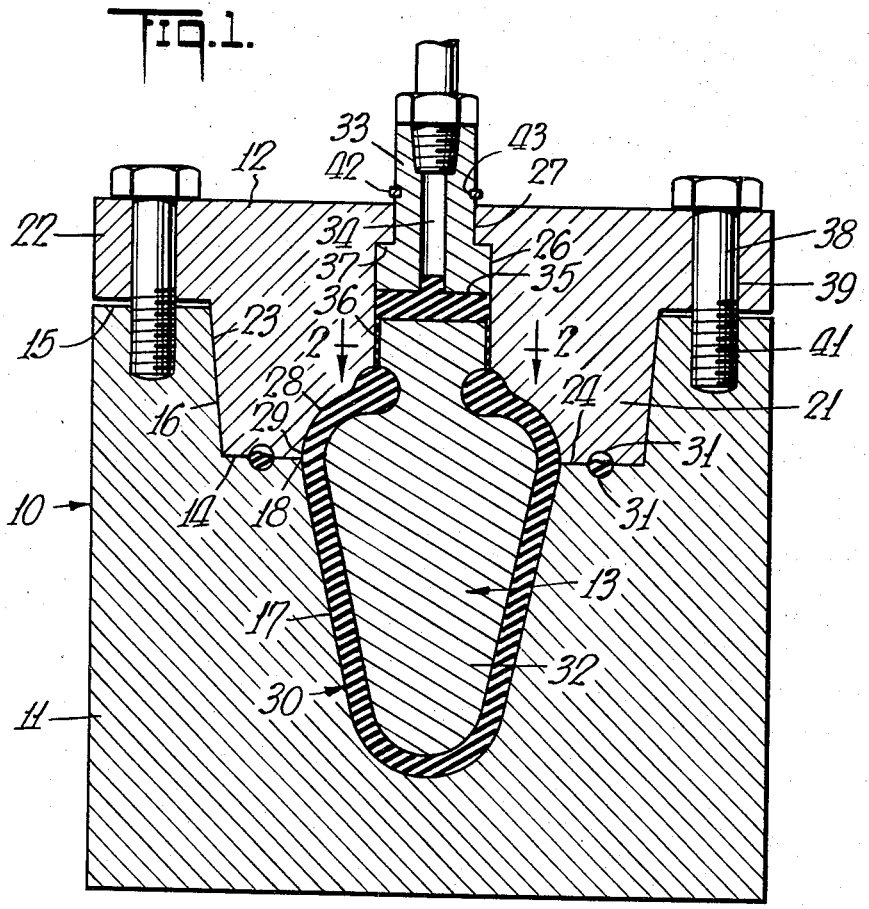
Fig. 1 is a sectional view of one embodiment of the invention.
Figure 2:
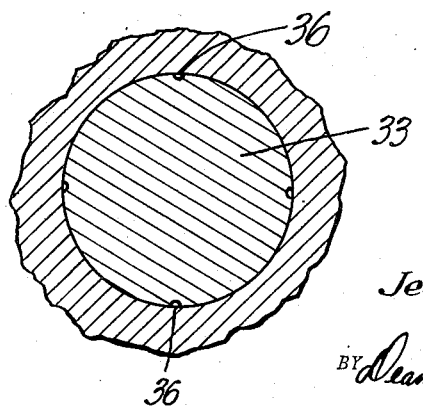
Fig. 2 is a transverse sectional view on a greatly enlarged scale taken along line 2—2 of Fig. 1.

Referring now to the drawings, a three piece mold 10 is shown having a base 11, a cover 12 and a core 13. The top wall 14 of the base 11 may have an upstanding rim 15, the inner wall 16 of which is desirably outwardly inclined at a relatively small angle of approximately five degrees from the vertical. A central recess 17 of desired configuration, illustratively substantially conical conforming to the desired configuration of the bottom portion of the bladder to be formed, is also provided in the base 11 with the mouth 18 of recess 17 being exposed at the top wall 14.

The cover 12 desirably has a central hub 21 defining an annular flange 22 which may be positioned over the rim 15 of base 11. The side wall 23 of the hub 21 is inclined at an angle complementary to the angle of inclination of wall 16 so that when the bottom 24 of the hub 21 is seated on the top wall 14 of base 11 the side wall 23 of the hub will press snugly against side wall 16 of rim 15 for effective sealing therebetween. The slight inclination of walls 16 and 23 facilitates removal of the cover after the molding operation has been completed, as upon lifting of the cover, the wall 23 will move away from wall 16 to break any adhesion therebetween due to seepage of the material being molded.

The cover 12 has an axial bore 26 therethrough which may have an inturned flange 27 at its upper end. The hub 21 at its bottom has a concave recess 28 conforming to the desired configuration of the top portion of the bladder and which is in communication at its upper end with the lower end of the bore 26 and has its mouth 29 of substantially the same diameter as the mouth 18 of the recess 17 in base 11. Thus when the cover 12 is positioned on base 11, the cover recess 28 and the base recess 17 will define the mold cavity 30.

The top wall 14 of the base 11 and the bottom 24 of the hub 21 each has an annular groove 31, which when the top wall 14 and bottom 24 are in juxtaposition define a reservoir to collect excess material from the mold cavity as the bladder is formed.

The core 13 comprises a body portion 32 of configuration complementary to that of the cavity defined by the base recess 17 and the cover recess 28 and an axial stem 33 which desirably has a central bore 34 leading into a transverse bore 35, the stem preferably having a plurality of longitudinal slots 36 in its periphery between the top of the body portion 32 and the transverse bore 35.

The stem 33 is designed to extend through the axial bore 26 in the cover 12 and fit snugly yet slidingly therein and is of reduced diameter at its upper end defining an annular shoulder 37 against which the flange 27 of the cover may abut.

Thus, when screws 38 which extend through openings 39 in flange 22 into threaded openings 41 in rim 15 are tightened, the coaction of the flange 27 and shoulder 37 will prevent upward movement of the core 13 with respect to the cover 12.

In addition, a snap ring 42 may be positioned in an annular groove 43 in the upper end of the stem protruding beyond the cover 12, so that the downward movement of the core 13 with respect to the cover will be limited.

To form the bladder, a predetermined charge of material such as uncured rubber, natural or synthetic is placed in the bottom of the recess 17 in base 11. The core 13 is then placed in the recess 17 and the cover 12 is placed over the top of the base so that the stem 33 of the core 13 extends through bore 26. The snap ring 42 is then placed in annular groove 43.

The cover 12 is then moved downwardly as by means of a hydraulic press (not shown) until the bottom 24 seats on the top wall 14 of the base 11 and the screws 38 are tightened. This movement will cause the flange 27 to engage the annular shoulder 37 of the stem 33 so that the core 13 will move downwardly into the mold cavity 30. The hydraulic press may then be released as no further movement can be imparted to cover 12.

The bladder thus formed by the downward movement of the core and the cover is then cured by the application of heat which in many cases is for a considerable period of time. During the curing operation pressure is applied to the bladder to prevent the formation of gas bubbles and voids therein and to ensure that all the materials from which the bladder is formed will be securely bonded together to form a substantial non-porous homogeneous unit.

This pressure is applied by means of a source of fluid under pressure desirably connected to the bore 34 of the stem 33. The charge of material originally placed into the cavity is sufficiently great so that when the cover was moved to seated position, there would be sufficient excess material to rise through the slots 36 and fill at least partially the transverse bore 35.

Thus the pressure applied to the bore 34 would react against the material in the transverse bore 35 and slots 36 so that the material that forms the bladder would be retained under pressure, yet there would be no direct contact of the fluid under pressure with the bladder itself.

With the equipment above described, the material forming the bladder would at all times during the curing period be maintained under pressure, even if there should be leakage, no matter how small, between the base and cover or at other points in the mold.

If a hydraulic press should be used to retain the cover and core in position to exert pressure on the bladder being formed, in addition to this being uneconomical as the press would be tied up during the long curing process, as the cover is seated on the base, any leakage from the mold would not be compensated with the attendant weakness in the bladder above pointed out.

In the event that gas bubbles should tend to form, the relatively high pressure exerted, which may be in the order of 100 atmospheres, would generally cause such gas bubbles to diffuse through the mass of the bladder and be eliminated so that the resultant bladder would be devoid of all voids or gas bubbles. Furthermore, such high pressure will cause the various materials from which the bladder is formed to be completely mixed and bonded together to form a homogeneous substantially non-porous unit. If not for the presence of such pressure during curing, as the cover 12 is locked against the base 11, if there should be leakage, the pressure against the bladder material would quickly fall with the difficulties previously pointed out.

In the remote event that gas bubbles are formed in the bladder that are of such size that they cannot be diffused even under the high pressure used, when the finished bladder is removed from the mold, as the pressure against the bladder would only be one atmosphere, such gas bubbles would expand to approximately 100 times their original volume and form a blister on the surface of the bladder that can readily be detected upon even a cursory inspection.

The snap ring 42 may be eliminated when the material from which the bladder is formed is highly viscous. Where a low viscosity material is used, the snap ring will properly space the core from the wall of the cavity in the mold and prevent the core from moving to the bottom of such cavity.

With the equipment above described, a bladder may be formed without the need for a hydraulic press to be used during the curing cycle, and with assurance that pressure will constantly be exerted against the bladder during the curing cycle so that the resultant product is devoid of voids, gas bubbles and forms a substantially homogeneous non-porous unit.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for molding bladders comprising a base having a recess therein, a cover having a recess, said base recess and said cover recess defining the mold cavity, said cover having a bore therethrough in communication with the mold cavity, a core having a stem portion extending through said cover bore and a body portion in said mold cavity, said stem having a transverse passageway between the ends thereof in communication with the mold cavity and a longitudinal passageway leading from the outer end thereof into said transverse passageway.

2. The combination set forth in claim 1 in which said stem has a plurality of longitudinal grooves in its periphery between the body portion of the core and said transverse passageway defining the communication between the transverse passageway and the mold cavity.

3. The combination set forth in claim 1 in which said stem has an annular shoulder near its upper end and the bore in said cover has a flange to coact with said annular shoulder.

4. The combination set forth in claim 3 in which the stem protrudes beyond the bore in said cover and means are provided on the protruding portion of said stem to limit the downward movement of the latter through said bore.

References Cited in the file of this patent

UNITED STATES PATENTS

| | | |
|---|---|---|
| Re. 23,176 | Milner | Nov. 29, 1949 |
| 2,333,131 | Tillyer et al. | Nov. 2, 1943 |
| 2,341,991 | Jackson | Feb. 15, 1944 |
| 2,377,892 | Lippincott | June 12, 1945 |
| 2,378,586 | Schultz | June 19, 1945 |
| 2,405,245 | Ushakoff | Aug. 6, 1946 |